United States Patent [19]

Ozawa

[11] Patent Number: 4,603,446
[45] Date of Patent: Aug. 5, 1986

[54] METHOD OF MAKING LOCK NUTS

[76] Inventor: Kunihiko Ozawa, 39-6, Tsurukawa 4, Machida, Tokyo, Japan

[21] Appl. No.: 741,270

[22] Filed: Jun. 4, 1985

[51] Int. Cl.⁴ .............................................. B21D 53/24
[52] U.S. Cl. ..................................................... 10/86 A
[58] Field of Search ................ 10/86 R, 86 A, 86 C; 411/427, 429, 436, 170, 172

[56] References Cited

U.S. PATENT DOCUMENTS 2,336,023  7/1943  Luce ..................................... 10/86 A
2,363,680  11/1944  Luce ..................................... 10/86 A
2,539,899  1/1951  Delaney ............................... 10/86 A

FOREIGN PATENT DOCUMENTS 56-1239  1/1981  Japan ..................................... 10/86 A Primary Examiner—E. Michael Combs
Attorney, Agent, or Firm—Holman & Stern

[57] ABSTRACT

A method of making loosening preventing nuts wherein a nut is cut down circularly on one end side to form a crown-shaped part, this crown-shaped part is cut as inclined in the opposite angle parts and is compressed in the axial direction with a die to be bent inward and, as a result, to be substantially hexagonal on the inner periphery of the tip, the same screw as the screw of the nut is threaded on the inner periphery of the tip and then the crown-shaped part is again compressed in the axial direction with the die to slightly reduce the inside diameter of the tip to thereby obtain a loosening preventing nut.

2 Claims, 10 Drawing Figures

FIG. 1 (A) PRIOR ART
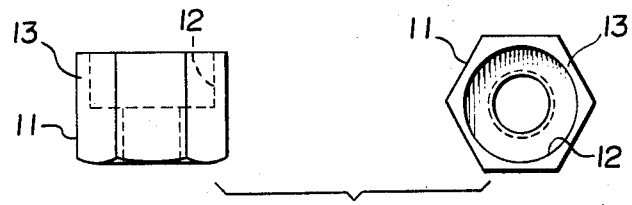
FIG. 1 (B)
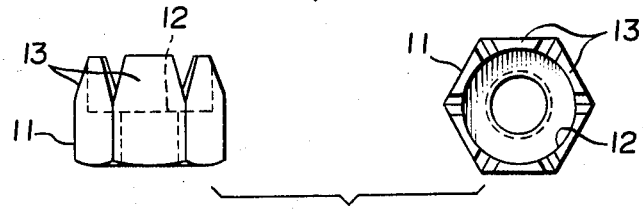
FIG. 1 (C)
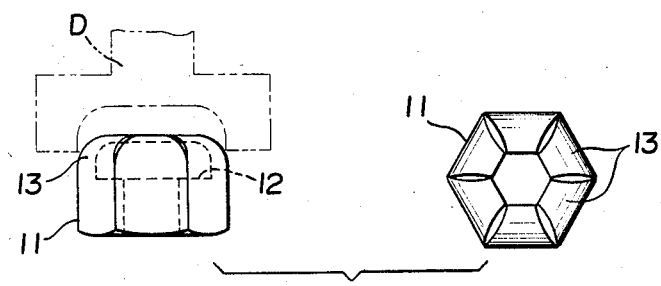
FIG. 1 (D)
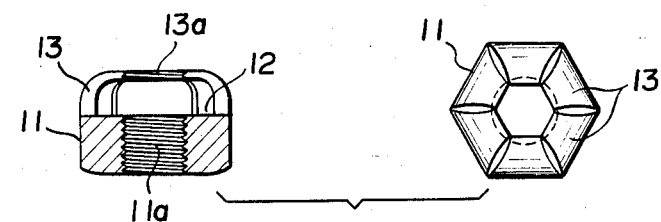
FIG. 1 (E)
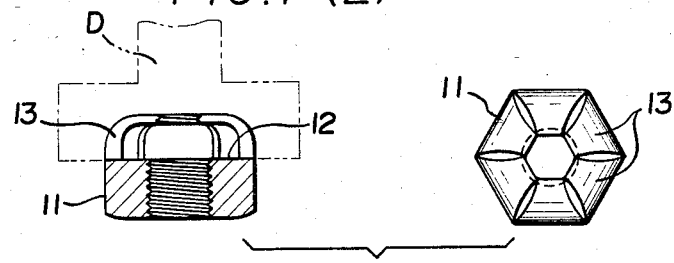

METHOD OF MAKING LOCK NUTS

BACKGROUND OF THE INVENTION (a) Field of the Invention

This invention relates to methods of making loosening preventing nuts.

(b) Description of the Prior Art

There is already known such method of making loosening preventing nuts as is shown, for example, in FIG. 1 wherein a nut 11 is cut down on one end side to be flat and circular to form a recess 12 and crown-shaped part 13, is cut off in the opposite angle parts of this crown-shaped part to be V-shaped, is then compressed in the axial direction with a die D to bend the opposite angle parts inward, is threaded with the same screw 13a as of the screw part 11a on the inner periphery of the tip of the crown-shaped part and is then again compressed with the same die to reduce the inside diameter of the crown-shaped part. In this nut, there are problems that the step of cutting off the opposite angle parts to be V-shaped is a bottle neck to the continuous operation, toils are required for the production and the cost is high.

SUMMARY OF THE INVENTION

The present invention is made by noting the above mentioned problems of the conventional loosening preventing nut of this kind and has it as an object to solve the above mentioned problems by eliminating the step of cutting the opposite angle parts to be V-shaped.

BRIEF DESCRIPTION OF THE DRAWINGS

FIG. 1 shows respective steps of making conventional loosening preventing nuts, (A) to (C) being respective elevations and plan views of the nut and (D) and (E) being respective vertically sectioned views and plan views of the nut.

DESCRIPTION OF THE PREFERRED EMBODIMENTS

Figure 2:
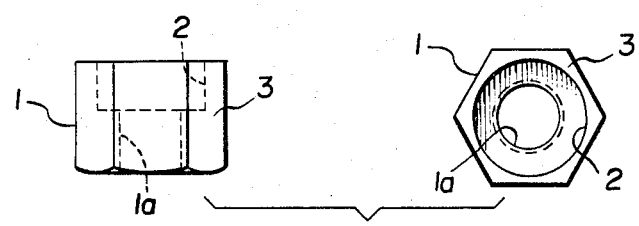
FIG. 2 shows respective steps of making loosening preventing nuts in the embodiment of the present invention, (A) to (C) being respective elevations and plan views of the nut and (D) and (E) being respective vertically sectioned views and plan views of the nut.
Figure 2:
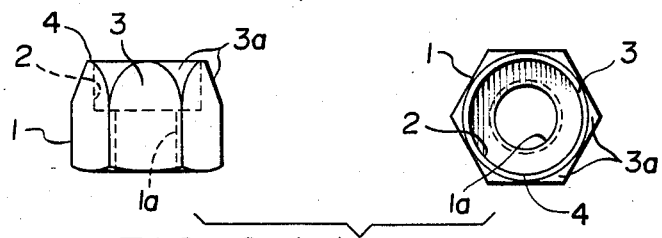
Figure 2:
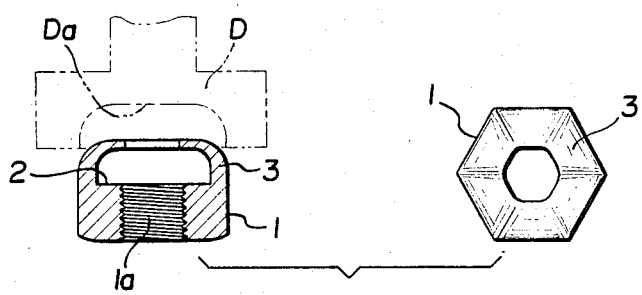
Figure 2:
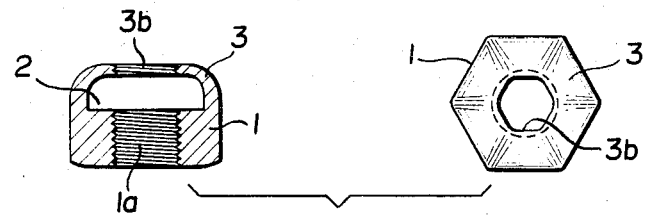
Figure 2:
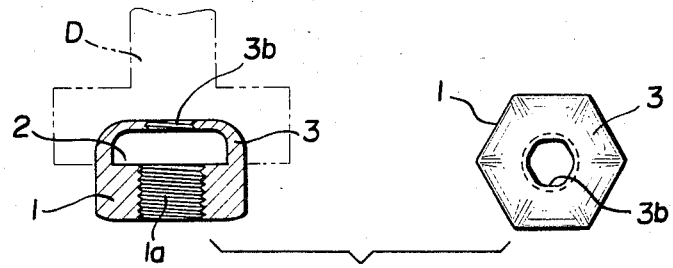

An embodiment of the present invention shall be explained in the following with reference to the drawings. As shown in FIG. 2(A), a nut 1 is first cut down to be flat and circular on one end side to form a recess 2 and a crown-shaped part 3.

Then, as shown in FIG. 2(B), the nut 1 is cut as inclined to expand downward to be circular as a whole on the outer periphery of the opposite angle parts to form slopes 3a. In this state, the crown-shaped part 3 is substantially uniform in the thickness in the tip or annular rim portion 4 but gradually increases in the thickness of each opposite angle part downward, is the least in the thickness in the middle of each opposite side part and is uniform in the thickness downward of this part.

Next, as in FIG. 2(C), the nut 1 is compressed axially in the crown-shaped part 3 with a die D provided with a recess Da of a substantially semicircular cross-section to bend the crown-shaped part 3 inward. At this time, as the parts of the opposite angle slopes 3a gradually expand downward, the outer periphery of the crown-shaped part will not uniformly contact the die D. That is to say, it is thought that the slopes 3a of the opposite angle parts will contact the die D under a higher pressure. However, as the opposite angle parts are thick and comparatively strong, the deformation by the compression will concentrate in the thin opposite side parts which will therefore protrude inward slightly more than the opposite angle parts. As a result, the inner periphery of the crown-shaped part will be of a substantially hexagonal shape similar to the contour of the nut 1.

Next, as in FIG. 2(D), the same screw 3b as of the screw part 1a of the nut 1 is threaded on the inner periphery of the tip of the crown-shaped part. It is possible to simultaneously thread the screw 1a of the nut with the screw 3b in this step. In the illustrated case, the screw part 1a of the nut is prior threaded.

Then, as in FIG. 2(E), the crown-shaped part 3 is axially compressed a little more than previously with the same die D as is mentioned above to reduce the inside diameter of the screw part 3b and to slightly move the screw pitch downward to obtain a loosening preventing torque. Even at this time, the opposite side parts will slightly more protrude inward and the screw part 3b will not become truly circular.

According to this method, such difficult step of cutting the opposite angle parts to be V-shaped as in the above mentioned conventional method can be eliminated and a loosening preventing nut can be made quickly and cheaply.

In the thus made loosening preventing nut, as thick parts and thin parts are made in the crown-shaped part and the screw part is not truly circular, the radial returning force for obtaining a loosening preventing torque will be strong and will be able to be maintained over a long period and the seizure at the time of screwing the nut to a bolt will be able to be prevented as features of the present invention.

I claim:

1. A method of making a lock nut comprising the steps of providing a polygonally-shaped blank with a plurality of flat side surfaces and an axial threaded through bore, forming a cylindrical recess of larger diameter than the through bore in one end portion of the blank, removing material from the exterior of said one end portion to provide said one end portion with a continuous annular rim of substantially uniform thickness and an outer surface with a plurality of sloping surfaces tapering outwardly from said annular rim to define a crown portion on said nut having thicker portions at apices of said flat sides and thinner portions along said flat sides between said apices in said crown portion, compressing the crown portion inwardly with differential deformation of the thinner and thicker portions to provide a central opening in the crown portion substantially aligned with the through bore, threading the opening in conformity with the through bore, and further compressing the crown portion with differential deformation of the thinner and thicker portions to reduce the diameter of the opening and provide same with a profile which is distorted from a circle toward a polygon conforming substantially to the polygonal shape of the nut.

2. The method as defined in claim 1 wherein the nut is hexagonally shaped.

* * * * *